US 10,465,844 B2

(12) United States Patent
Mandera et al.

(10) Patent No.: US 10,465,844 B2
(45) Date of Patent: Nov. 5, 2019

(54) OIL-AIR LUBRICANT DISTRIBUTOR

(71) Applicants: Markus Mandera, Leimen (DE); Juergen Kreutzkaemper, Waibstadt-Daisbach (DE); Andreas Schoenfeld, Sankt Leon-Rot (DE); Stefan Schuermann, Tuebingen (DE)

(72) Inventors: Markus Mandera, Leimen (DE); Juergen Kreutzkaemper, Waibstadt-Daisbach (DE); Andreas Schoenfeld, Sankt Leon-Rot (DE); Stefan Schuermann, Tuebingen (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 215 days.

(21) Appl. No.: 15/297,681

(22) Filed: Oct. 19, 2016

(65) Prior Publication Data

US 2017/0114956 A1 Apr. 27, 2017

(30) Foreign Application Priority Data

Oct. 27, 2015 (DE) .................. 10 2015 220 960

(51) Int. Cl.
*F16N 25/00* (2006.01)
*F16N 7/32* (2006.01)

(52) U.S. Cl.
CPC .............. *F16N 25/00* (2013.01); *F16N 7/32* (2013.01)

(58) Field of Classification Search
CPC . F16N 25/00; F16N 27/00; F16N 7/30; F16N 7/32; B01F 5/045

USPC .................... 137/597, 896; 261/78
See application file for complete search history.

(56) References Cited

U.S. PATENT DOCUMENTS

| 3,050,083 A | * | 8/1962 | Verway | B23Q 11/10 |
| | | | | 137/625.18 |
| 5,253,733 A | | 10/1993 | Miyachi | |
| 6,290,024 B1 | * | 9/2001 | Ehlert | F16N 7/32 |
| | | | | 184/6.22 |
| 9,127,808 B2 | * | 9/2015 | Divisi | F16N 25/02 |
| 2001/0025891 A1 | * | 10/2001 | Hara | F16N 7/32 |
| | | | | 239/290 |

(Continued)

FOREIGN PATENT DOCUMENTS

| CN | 101555983 A | 10/2009 |
| CN | 101907004 A | 12/2010 |

(Continued)

*Primary Examiner* — Michael R Mansen
*Assistant Examiner* — Robert T Reese
(74) *Attorney, Agent, or Firm* — Bryan Peckjian; SKF USA Inc. Patent Dept.

(57) ABSTRACT

An oil-air lubricant distributor with a tubular distributor body that includes an oil-air mixture inlet and a plurality of lubrication-point outlets for dispensing the oil-air mixture to at least one consumer, wherein the lubrication-point outlets are connected to the oil-air mixture inlet via line channels, and the line channels are provided with an oil-air mixture from a mixture distributor unit, the mixture distributor unit including a single oil inlet, a single air inlet, and a plurality of oil-air-mixture outlets, and wherein the oil-air mixture inlet is directly but releasably connected to the mixture distributor, and the oil-air-mixture outlets are directly but releasably fluidly connected to the line channels in the tubular distributor body.

12 Claims, 3 Drawing Sheets

(56) References Cited

U.S. PATENT DOCUMENTS

| | | | |
|---|---|---|---|
| 2009/0230215 A1* | 9/2009 | Link | B05B 7/0012 239/338 |
| 2011/0036422 A1* | 2/2011 | Hanley | F16K 15/044 137/511 |
| 2011/0259671 A1* | 10/2011 | Amilien | F16N 7/32 184/6.26 |
| 2012/0031705 A1* | 2/2012 | Divisi | F16N 7/32 184/55.1 |
| 2014/0331862 A1* | 11/2014 | Cullinane | B01D 53/18 95/186 |
| 2015/0330564 A1* | 11/2015 | Mueller | F16N 25/00 184/7.4 |
| 2016/0184844 A1* | 6/2016 | Di Gioia | B05B 5/03 239/706 |

FOREIGN PATENT DOCUMENTS

| | | |
|---|---|---|
| CN | 102026733 A | 4/2011 |
| CN | 202580568 U | 12/2012 |
| DE | 881180 C | 6/1953 |
| DE | 4344788 A1 | 7/1994 |
| DE | 102005010132 A1 | 9/2006 |
| DE | 202007008531 U1 | 10/2007 |
| EP | 2039978 A2 | 3/2009 |
| JP | S62106196 A | 5/1987 |
| JP | 2001032995 A | 2/2001 |
| JP | 2002130587 A | 5/2002 |

* cited by examiner

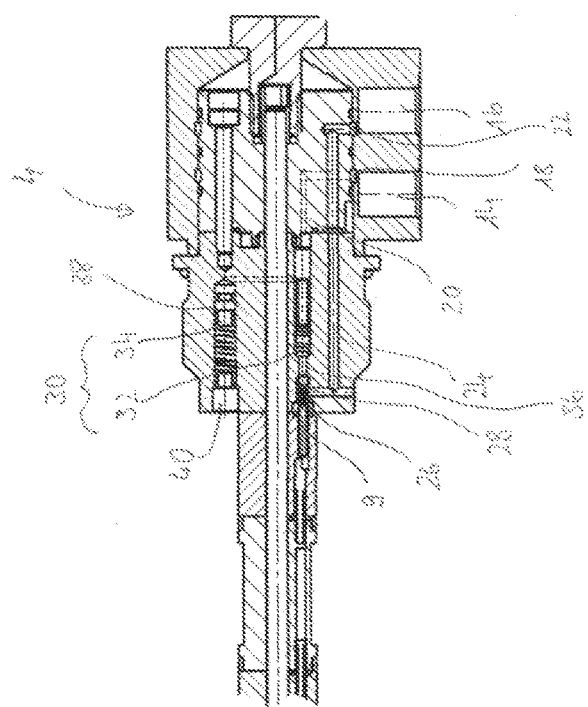
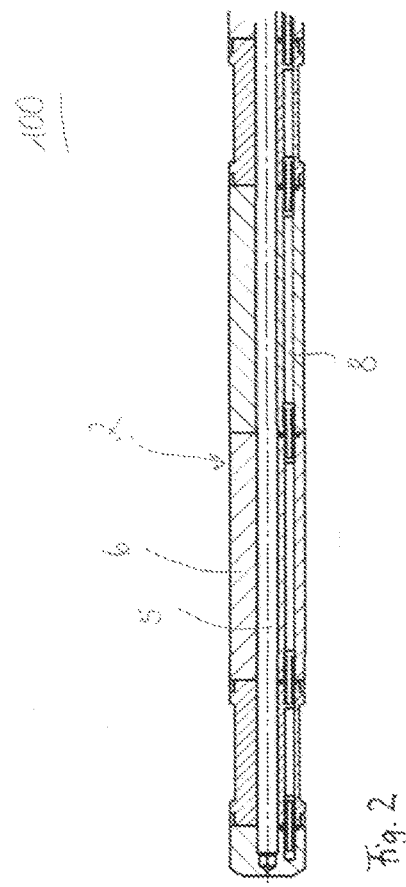
Fig. 2

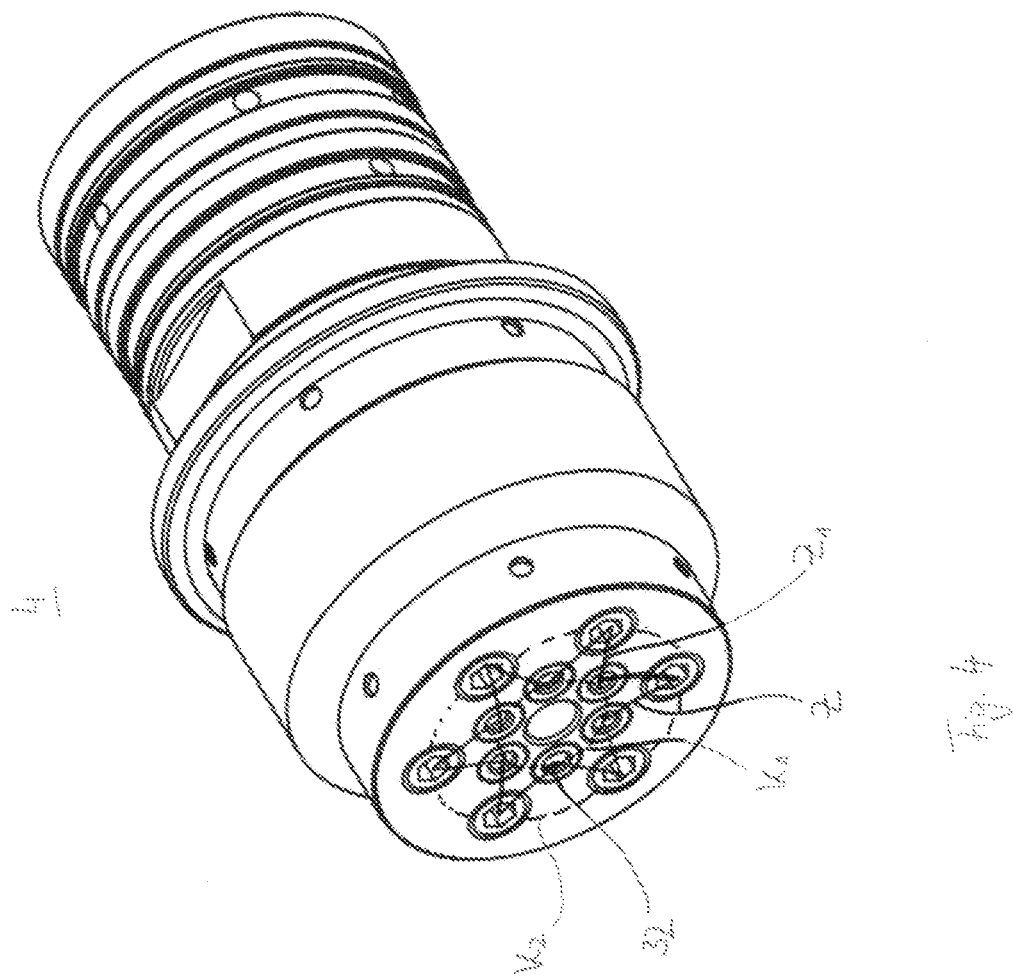

OIL-AIR LUBRICANT DISTRIBUTOR

CROSS-REFERENCE

This application claims priority to German patent application no. 10 2015 220 960.1 filed on Oct. 27, 2015, the contents of which are fully incorporated herein by reference.

TECHNOLOGICAL FIELD

The present disclosure is directed to an oil-air lubricant distributor with a tubular distributor body that includes an inlet for an oil-air mixture and a plurality of lubrication-point outlets for dispensing the oil-air mixture to at least one consumer.

BACKGROUND

An oil-air lubricant distributor of the above-mentioned type including a tubular distributor body is known, for example, from DE 20 2007 008 531 (a family member of US 2010/0178000). This lubricant distributor includes a tubular lance with a plurality of lubricant outlets, and an insert cartridge configured as a metering valve is disposed on each of the lubricant outlets. The insert cartridge is configured to dispense a metered amount of lubricant to the lubricant dispensing point. An air channel that runs parallel to the lubricant supply is also provided, which air channel pumps compressed air to the lubricant outlets, to which lubricant outlets the oil metered by the metering valve is dispensed and pumped toward the consumer.

However it is disadvantageous in such a lubricant distributor that the metering valves are fixedly installed in the tubular distributor so that in the event that one of the metering valves fails the entire tubular distributor must be removed and exchanged. Moreover, even for adjusting the lubricant amount the entire tubular distributor must be removed, which leads to a very high assembly and maintenance expense.

A lubricant distributor is also known from, for example, EP 2039978, in which a tubular distributor body includes pump lines that are connected to connection lines, via which a pre-metered lubricant amount is supplied to the tubular distributor body. Although this makes the metering points more accessible, the metering points themselves must be accommodated at an external location that lies outside the distributor and is easily accessible. Furthermore, it is disadvantageous that a high air pressure is required for pumping the oil-air mixture in the connection lines, in the range of 3 to 4 bar, in order to pump the oil-air mixture via the connection lines to the tubular distributor.

SUMMARY

An aspect of the present disclosure is therefore to provide an oil-air lubricant distributor that is easier to maintain and adjust and that simultaneously requires no additional installation space.

In the following description, an oil-air lubricant distributor with a tubular distributor body is presented, which oil-air lubricant distributor includes an inlet for an oil-air mixture and a plurality of lubrication-point outlets for dispensing the oil-air mixture to a consumer (e.g., a point or object that requires lubrication). Here the lubrication-point outlets are connected to the inlet via connection lines, and the line channels are provided with an oil-air mixture from a mixture distributor unit. This mixture distributor unit in turn includes a single oil inlet, a single air inlet, and a plurality of oil-air mixture outlets.

In order to provide an oil-air lubricant distributor that is simple to adjust but that requires no additional installation space, the disclosure further provides that the inlet of the oil-air lubricant distributor is directly but releasably connected to the mixture distributor unit, and the oil-air mixture outlets are directly but releasably fluidly connected to the line channels in the tubular distributor. On one hand additional connection lines from the metering valve to the tubular distributor, as known from the prior art, can thereby be omitted. At the same time, however, the direct but releasable connection of the mixture distributor makes possible an easy exchangeability and thus maintenance, as well as an easy adjusting via freely accessible metering points. Furthermore, the oil-air lubricant distributor can be operated with less compressed air, because the oil-air mixture no longer needs to be transported to the tubular distributor via long connection lines as known from the prior art. This even allows the compressed air pressure to be reduced to below 1 bar, which means a significant saving of compressed air and a cost reduction.

As mentioned above a "direct connection" is understood to mean a connection without intermediate elements, i.e., in this case without interposed connection lines or tubes. In contrast thereto an "indirect connection" is understood to mean a connection wherein one or more intermediate elements, such as, for example, connection lines, are present between the line channels of the tube-shaped distributor and the oil-air-mixture outlets of the mixture unit.

Here the mixture distributor unit can be plugged-in, snapped-in, or screwed-in into the tubular distributor. These attachment options make possible a quick, simple and releasable, yet still direct, connection between the mixture distributor unit and the tubular distributor body.

According to a further advantageous exemplary embodiment the air inlet of the mixture distributor is connected to a plurality of air distributor channels, and the oil inlet of the mixture distributor unit with a plurality of oil distributor channels, wherein each oil-air mixture outlet is respectively associated with an air distributor channel and an oil distributor channel. Via the air distributor channels the air is thereby distributable from the single air inlet, and via the oil distributor channels the oil is thereby distributable from the single oil inlet, to the oil-air-mixture outlets. A mixture distributor unit can thereby be provided that quickly and simply distributes the single air stream and the single oil stream from the oil inlet or the air inlet to the oil-air-mixture outlets. In addition, the compressed air can impact against the oil so that a particularly good oil-air mixture arises that ensures a good lubrication even with minimal amounts. This is in part because as soon as a drop of oil is introduced in the air stream it is pulled apart on the way to the lubrication point in a smear-like manner by the air stream, and the air stream in the center of the channel transports the oil along on the channel inner wall. The transport air escapes at the lubrication point and transfers the oil drops or the oil smears to the consumer.

According to a further advantageous exemplary embodiment the air distributor channel and/or the oil distributor channel each has a check valve. Air can thereby be prevented from being introduced upstream into the oil distributor channel or upstream into the air distributor channel.

According to a further advantageous exemplary embodiment each oil distributor channel includes a metering element that dispenses a metered amount of oil in the air stream of the associated air distributor channel. Different lubricant outlets can thereby be supplied with differently dosed oil-air mixtures. This is useful, for example, for lubricating bearings in which different bearing elements have different lubrication needs. Thus lubricating a seal requires significantly less lubricant than lubricating bearing rings or rolling elements.

According to a further advantageous exemplary embodiment, each metering unit includes a metering piston or metering screw and a pumping piston. Since the metering pistons or metering screws are usually easily and quickly adjustable in their metering, the design of each metering unit with a metering piston and a pumping piston makes possible a simple and rapid adjustability of the metering of the oil-air mixture.

According to a further advantageous exemplary embodiment the metering piston and the pumping piston are disposed in two separate cylinder bores. Although separating the metering piston and the pumping piston requires two separate cylinder bores, it makes possible a large constructive freedom and a lower installation-space requirement than with the usual metering-pumping-piston systems disposed in a nested manner. In addition, in the separate design the pistons can be embodied smaller, since no nested movable parts are required as in a conventional combined metering-pumping-piston system. The mixture distributor unit can thereby be built significantly more compact so that a simple integration with the tubular distributor is possible.

According to a further advantageous exemplary embodiment the pumping pistons are distributed along a first circle and the metering pistons along a second circle, wherein the circles themselves are concentric to each other. Here it is advantageous in particular if the pumping pistons are disposed radially inside the metering pistons. Since the tubular distributor is usually designed smaller in terms of diameter than the mixture distributor unit, such a distribution makes possible a direct contact of the pumping piston to the tubular distributor. At the same time, however, the outwardly disposed metering pistons, whose metering is adjustable via an outwardly accessible metering screw, are not covered, so that a changing of the metering amount is possible without removal of the oil-air lubricant distributor.

According to a further advantageous exemplary embodiment the air distributor channel opens downstream of the pumping piston into the cylinder bore of the pumping piston, and the cylinder bore of the pumping piston is preferably simultaneously designed as an oil-air mixture outlet. On one hand a particularly compact mixture distributor unit can thereby be provided; on the other hand the number of bores needed can thereby also be reduced.

In order to provide a particularly compact design of the mixture distributor unit, the pumping piston and the metering piston can furthermore be configured such that a metering piston is disposed between each two pumping pistons, wherein an imaginary connecting line alternatingly connecting the centerpoints of the cylinder bores including the pumping pistons and the centerpoints of the cylinder bores including the metering pistons is star shaped.

According to a further advantageous exemplary embodiment the mixture distributor unit itself is cylindrical, and the pumping-piston/metering-piston systems are disposed circumferentially about the mixture distributor unit. A greatest-possible compactness of the mixture distributor unit can thereby be provided.

According to a further advantageous exemplary embodiment the tubular distributor body and/or the mixture distributor unit includes at least one positioning aid that determines a positioning of the mixture distributor unit on the tube-shaped distributor body such that the line channels of the tubular distributor body are fluidly connected to the oil-air-mixture outlets of the mixture distributor unit. It can thereby be simply and quickly ensured that the oil-air mixture outlets of the mixture distributor unit fluidly coincide with the line channels of the tubular distributor body, and a targeted dispensing of an oil-air mixture to the lubricant outlets of the tubular distributor body is thereby made possible. The positioning aid can be, for example, a marking or notching. However, it is also possible to form the positioning aid with the help of a bayonet closure or of another snap-in connection that simultaneously secures the mixture distributor unit on the tubular distributor body and determines a defined location position.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure is described in more detail with reference to the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 2 is a further schematic sectional view through the oil-air lubricant distributor of FIG. 1.

FIG. 3 is a detail view of the tubular distributor of the oil-air lubricant device of FIG. 1.

FIG. 4 is a perspective view of the mixture distributor unit of FIGS. 1 and 2.

DETAILED DESCRIPTION

Figure 1:
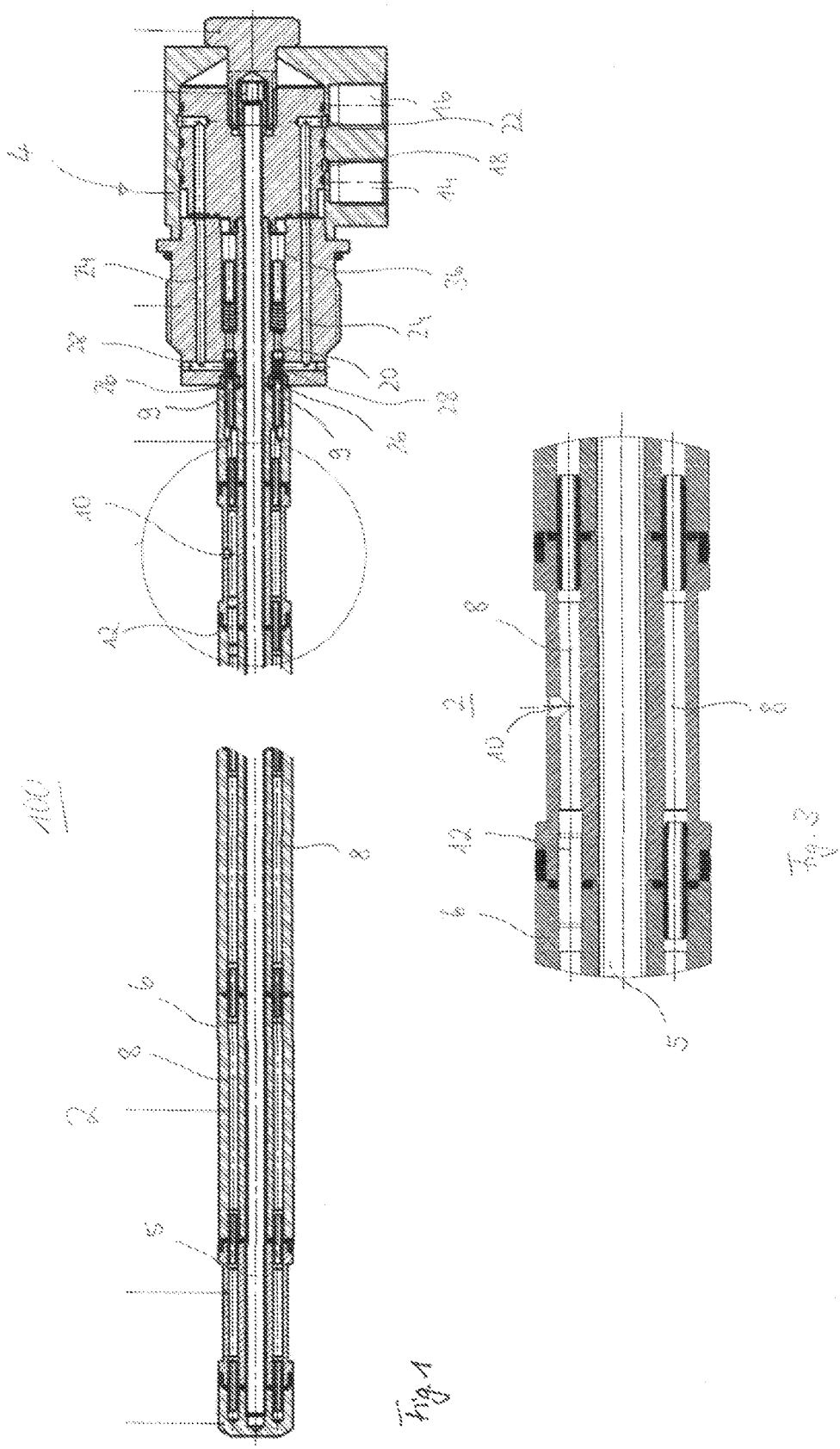
FIG. 1 is a schematic sectional view through a preferred exemplary embodiment of an oil-air lubricant distributor.

In the following, identical or functionally equivalent elements are designated by the same reference numbers.

FIG. 1 and FIG. 2 show different sectional views through an oil-air lubricant distributor 100 with a tubular distributor body 2 that is directly but releasably connected to a lubricant distributor unit 4. The tubular distributor body 2 is essentially formed by a threaded rod 5 and a sleeve 6 carried by the threaded rod 5, wherein a plurality of line channels 8 are formed in an intermediate space between the threaded rod 5 and the sleeve 6, which line channels 8 end at an inlet 9. This structure is also depicted in the enlarged depiction of FIG. 3 that shows a section through the tubular distributor body 2. As can furthermore be seen from FIG. 1 and FIG. 3, bores 10 are provided in the sleeve 6, which bores 10 from a lubricant outlet from the channel 8 and thus from the tubular distributor body 2. In order to only supply certain lubricant outlets 10 with lubricant, a closure element 12, as depicted in FIG. 3, can furthermore be provided in the lubricant channel 8, which blocks the further channel course of the channel 8 after the lubrication point 10. Each lubricant channel 8 can thereby be associated with exactly one lubricant outlet 10.

The mixture distributor unit 4 provides each of the channels 8 with an oil-air mixture that is precisely metered for the respective lubricant outlet 10. The mixture distributor unit 4 is directly but releasably connected to the tubular distributor body 2; for example, a connection is possible via plugging-in, screwing-in, or snapping-in. Furthermore, position markings can be available on the tubular distributor body 2 and/or on the mixture distributor unit 4 that make possible an exact positioning of the mixture distributor unit 4 with respect to the tubular distributor body 2 so that the corresponding line channels 8 can be provided with the oil-air mixture.

In addition to FIGS. 1 and 2, the mixture distributor device is depicted in particular in the spatial depiction of FIG. 4. The mixture distributor unit 4 includes a single oil inlet 14 and a single air inlet 16. The oil inlet 14 is in turn fluidly connected via an annular channel 18 to a plurality of oil distributor channels 20. In an analogous manner the air inlet 16 is also connected via an annular channel 22 to a plurality of air distributor channels 24. However, of the air distributor channels 24 or oil distributor channels 20 only one is to be seen in the sectional view of FIG. 2, while FIG. 1 only shows the air distributor channels 24. Furthermore, FIGS. 1 and 2 show that the oil distributor channel 20 and the air distributor channel 24 open in an oil-air mixture outlet 26 that is in turn fluidly connected to the line channel 8 of the tubular distributor 2. In order to prevent a backflow of oil into the air distributor channel 24 or a backflow of air into the oil distributor channel 20, at least one check valve 28 is furthermore provided.

Furthermore, FIGS. 1 and 2 show that a metering unit 30 is disposed in the oil distributor channel 20, which metering unit 30 comprises a pumping piston 32 and a metering piston 34. Here the metering piston 32 and the pumping piston 34 are disposed in separate cylinder bores 36, 38 in the housing of the mixture distributor unit 4. Here in particular the cylinder bore 36 of the pumping piston is simultaneously configured as oil distributor channel 20. Thus few bores need to be formed in the mixture distributor unit 4. The cylinder bore 36 of the pumping piston 32 simultaneously also serves as oil-air mixture outlet 26, wherein the air distributor channel 24 opens downstream of the pumping piston 32.

Since the pumping piston 32 and the metering piston 34 are formed separate, and, as can be seen in particular from the spatial view of FIG. 4, the pumping piston 32 can be disposed along a first circle K1 having a small diameter, a direct connection to the line channel 8 is possible. Furthermore it is seen in FIG. 4 that the metering pistons 34 are disposed radially outside the pumping piston 32 on a second circle K2 concentric to the first circle K1. This radially outer arrangement makes possible, as can be seen in FIG. 2, a free accessibility of the metering screw 40 even with flange-mounted tubular distributor body 2.

In order to provide a particularly compact design, as can furthermore be seen in FIG. 4 the pumping pistons 32 and the metering pistons 34 are alternatingly disposed so that an imaginary line Z extending through the centerpoints forms a star shape with the metering pistons 34 at the star points. The installation space can thereby also be optionally exploited.

It can also be seen from the Figures that the metering piston 34 is configured larger than the pumping piston 32. However, it is also possible to dimension metering piston 34 and pumping piston 32 identically.

Overall, with the proposed oil-air lubricant distributor an oil-air mixture can be supplied directly to different points of a consumer, while the metering is simultaneously easily adjustable and maintenance work can be made possible in a simple manner without complicated modifications. In addition, extra installation space need not be provided in order to provide an external metering and mixture valve that dispenses a metered amount of oil into the air stream of the oil-air mixture. Since moreover the air supplying occurs directly at the lubrication point, the air requirement can be significantly reduced overall so that the oil-air lubricant distributor can be operated with less than 1 bar of compressed air pressure instead of the usual 3 to 4 bar. This air-pressure reduction is achieved in particular in that no long connection lines as are known from the prior art need be provided between the mixture distributor unit and the lubrication point outlets; rather the air-oil mixture is dispensed directly to the tubular distributor body 2. Furthermore, the proposed oil-air lubricant distributor has the advantage that due to the two-piston arrangement and metering a particularly compact design can be achieved, wherein, however, the metering screws can nonetheless be freely accessible even in assembly.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved oil-air lubricant distributor.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Oil-air lubricant distributor
2 Tubular distributor body
4 Mixture distributor unit
5 Threaded rod
6 Sleeve
8 Line channel
9 Inlet
10 Lubricant outlet
12 Closure element
14 Oil inlet
16 Air inlet
18 Annular channel—oil
20 Oil distributor channel
22 Annular channel—air
24 Air distributor channel
26 Oil-air-mixture outlet 28 Check valve
30 Metering unit
32 Pumping piston
34 Metering piston
36, 38 Cylinder bore
40 Metering screw

What is claimed is:

1. An oil-air lubricant distributor, comprising:
a mixture distributor unit which provides an oil-air mixture to a tubular distributor body, the tubular distributor body includes a plurality of lubrication-point outlets for dispensing the oil-air mixture to at least one consumer;
the mixture distributor unit comprising a single oil inlet and a single air inlet for providing oil and air for mixing to form the oil-air mixture, the mixture distributor unit mixing the oil and air and communicating the oil-air mixture to the tubular distributor body via a plurality of oil-air-mixture outlets,
wherein the lubrication-point outlets are in fluid communication with the oil-air mixture provided by the mixture distributor unit via line channels, the mixture distributor unit is in fluid communication with the single oil inlet and the single air inlet;
wherein the single air inlet and the single oil inlet are directly but releasably connected to the mixture distributor unit, and the plurality of oil-air-mixture outlets are directly but releasably fluidly connected to the line channels in the tubular distributor body;
wherein the single air inlet for the mixture distributor unit is fluidly connected thereto via a plurality of air distributor channels, wherein the single oil inlet for the mixture distributor unit is fluidly connected thereto via a plurality of oil distributor channels,
wherein each of the plurality of oil-air-mixture outlets is respectively associated with one of the plurality of air distributor channels and with one of the plurality of oil distributor channels so that air is distributable via the air distributor channels from the single air inlet to the oil-air-mixture outlets, and oil is distributable via the oil distributor channels from the single oil inlet to the oil-air-mixture outlets;
wherein each of the oil distributor channels includes a metering unit configured to dispense a metered amount of oil into an air stream of one of the air distributor channels; and
wherein each metering unit includes a metering piston and a pumping piston.

2. The oil-air lubricant distributor according to claim 1, wherein the mixture distributor unit is plugged-in, snapped-in, or screwed-in into the tubular distributor body.

3. The oil-air lubricant distributor according to claim 1, wherein at least one of the air distributor channels includes a check valve and/or at least one of the oil distributor channels includes a check valve.

4. The oil-air lubricant distributor according to claim 1, wherein the metering piston and the pumping piston are disposed in separate cylinder bores.

5. The oil-air lubricant distributor according to claim 4, wherein the pumping pistons are disposed along a first circle having a first diameter and the metering pistons are disposed along a second circle having a second diameter greater than the first diameter, wherein the first circle is disposed concentrically within the second circle.

6. The oil-air lubricant distributor according to claim 5, wherein the pumping pistons and metering pistons are disposed such that each metering piston is disposed circumferentially between two of the pumping pistons, and wherein an imaginary line alternatingly connecting centerpoints of the cylinder bores including the pumping pistons and centerpoints of the cylinder bores including the metering pistons is star-shaped.

7. The oil-air lubricant distributor according to claim 4, wherein the mixture distributor unit is cylindrical, and the metering units are disposed circumferentially about the mixture distributor unit.

8. An oil-air lubricant distributor, comprising:
a mixture distributor unit which provides an oil-air mixture to a tubular distributor body, the tubular distributor body includes a plurality of lubrication-point outlets for dispensing the oil-air mixture to at least one consumer;
the mixture distributor unit comprising a single oil inlet and a single air inlet for providing oil and air for mixing to form the oil-air mixture, the mixture distributor unit mixing the oil and air and communicating the oil-air mixture to the tubular distributor body via a plurality of oil-air-mixture outlets,
wherein the lubrication-point outlets are in fluid communication with the oil-air mixture provided by the mixture distributor unit via line channels, the mixture distributor unit is in fluid communication with the single oil inlet and the single air inlet;
wherein the single air inlet and the single oil inlet are directly but releasably connected to the mixture distributor unit, and the plurality of oil-air-mixture outlets are directly but releasably fluidly connected to the line channels in the tubular distributor body;
wherein the single air inlet for the mixture distributor unit is fluidly connected thereto via a plurality of air distributor channels, wherein the single oil inlet for the mixture distributor unit is fluidly connected thereto via a plurality of oil distributor channels,
wherein each of the plurality of oil-air-mixture outlets is respectively associated with one of the plurality of air distributor channels and with one of the plurality of oil distributor channels so that air is distributable via the air distributor channels from the single air inlet to the oil-air-mixture outlets, and oil is distributable via the oil distributor channels from the single oil inlet to the oil-air-mixture outlets;
wherein each of the oil distributor channels includes a metering unit configured to dispense a metered amount of oil into an air stream of one of the air distributor channels; and
wherein at least one of the air distributor channels includes a check valve and/or at least one of the oil distributor channels includes a check valve;
wherein the mixture distributor unit is plugged-in, snapped-in, or screwed-in into the tubular distributor body;
wherein each metering unit includes a metering piston and a pumping piston.

9. The oil-air lubricant distributor according to claim 8, wherein the tubular distributor body and/or the mixture distributor unit includes at least one positioning aid configured to ensure a positioning of the mixture distributor unit in the tubular distributor body such that the line channels of the tubular distributor body are fluidly connected to the oil-air-mixture outlets of the mixture distributor unit.

10. The oil-air lubricant distributor according to claim 8, wherein the metering piston and the pumping piston are disposed in separate cylinder bores.

11. The oil-air lubricant distributor according to claim 10, wherein the pumping pistons are disposed along a first circle having a first diameter and the metering pistons are disposed along a second circle having a second diameter greater than the first diameter, wherein the first circle is disposed concentrically within the second circle.

12. The oil-air lubricant distributor according to claim 11, wherein the pumping pistons and metering pistons are disposed such that each metering piston is disposed circumferentially between two of the pumping pistons, and wherein an imaginary line alternatingly connecting centerpoints of the cylinder bores including the pumping pistons and centerpoints of the cylinder bores including the metering pistons is star-shaped.

* * * * *